Figure 1:
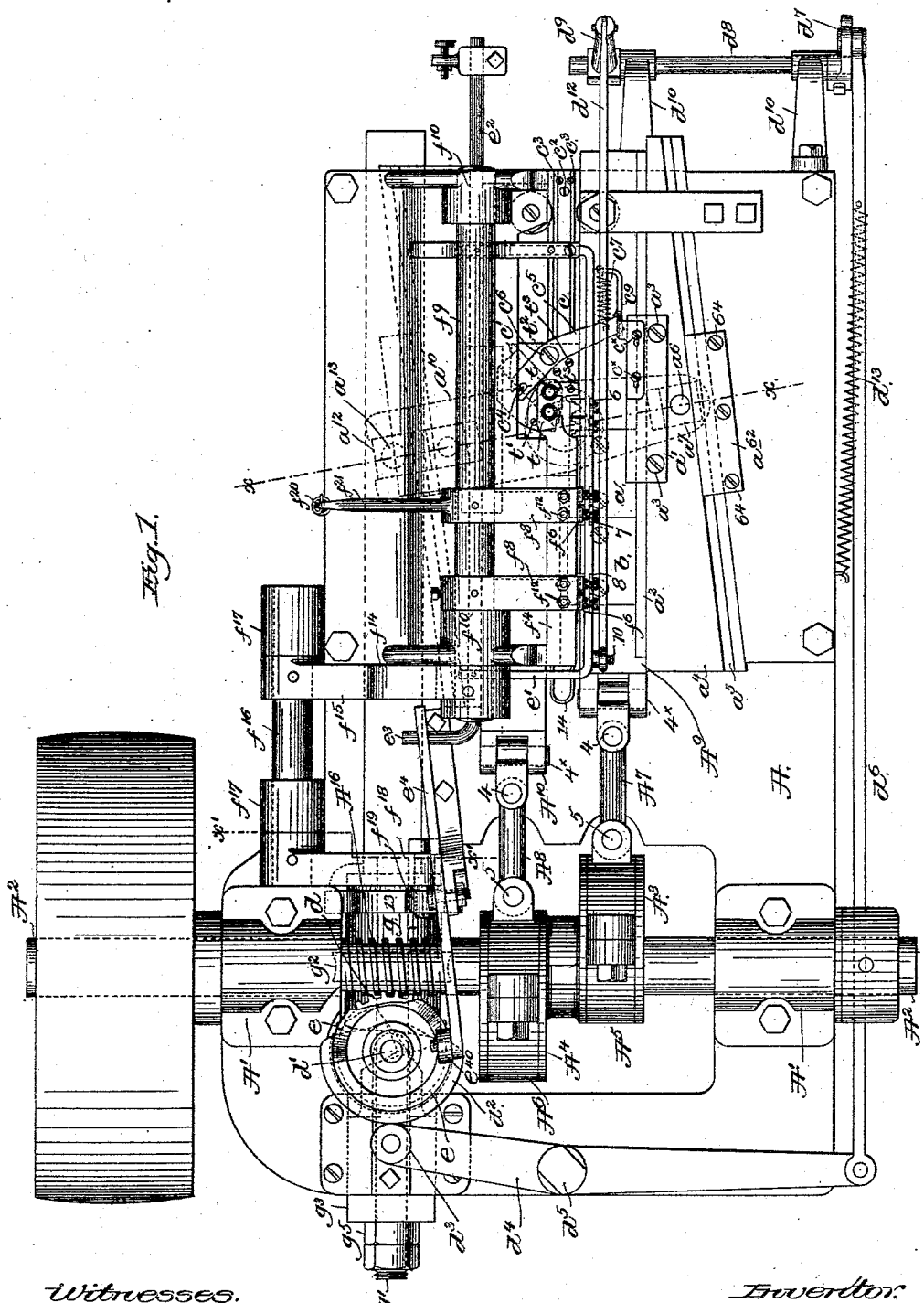

(No Model.)  6 Sheets—Sheet 1.
H. H. CUMMINGS.
MACHINE FOR MAKING RIVETS.

No. 414,683. Patented Nov. 12, 1889.

Witnesses.
John F. C. Prinkert
Frederick L. Emery

Inventor:
Henry H. Cummings.
by Crosby & Gregory
attys.

(No Model.) 6 Sheets—Sheet 2.

H. H. CUMMINGS.
MACHINE FOR MAKING RIVETS.

No. 414,683. Patented Nov. 12, 1889.

Witnesses.
John F. C. Parmelee
Frederick L. Emery

Inventor:
Henry H. Cummings
by Crosby & Gregory
Attys.

(No Model.) 6 Sheets—Sheet 3.
H. H. CUMMINGS.
MACHINE FOR MAKING RIVETS.
No. 414,683. Patented Nov. 12, 1889.
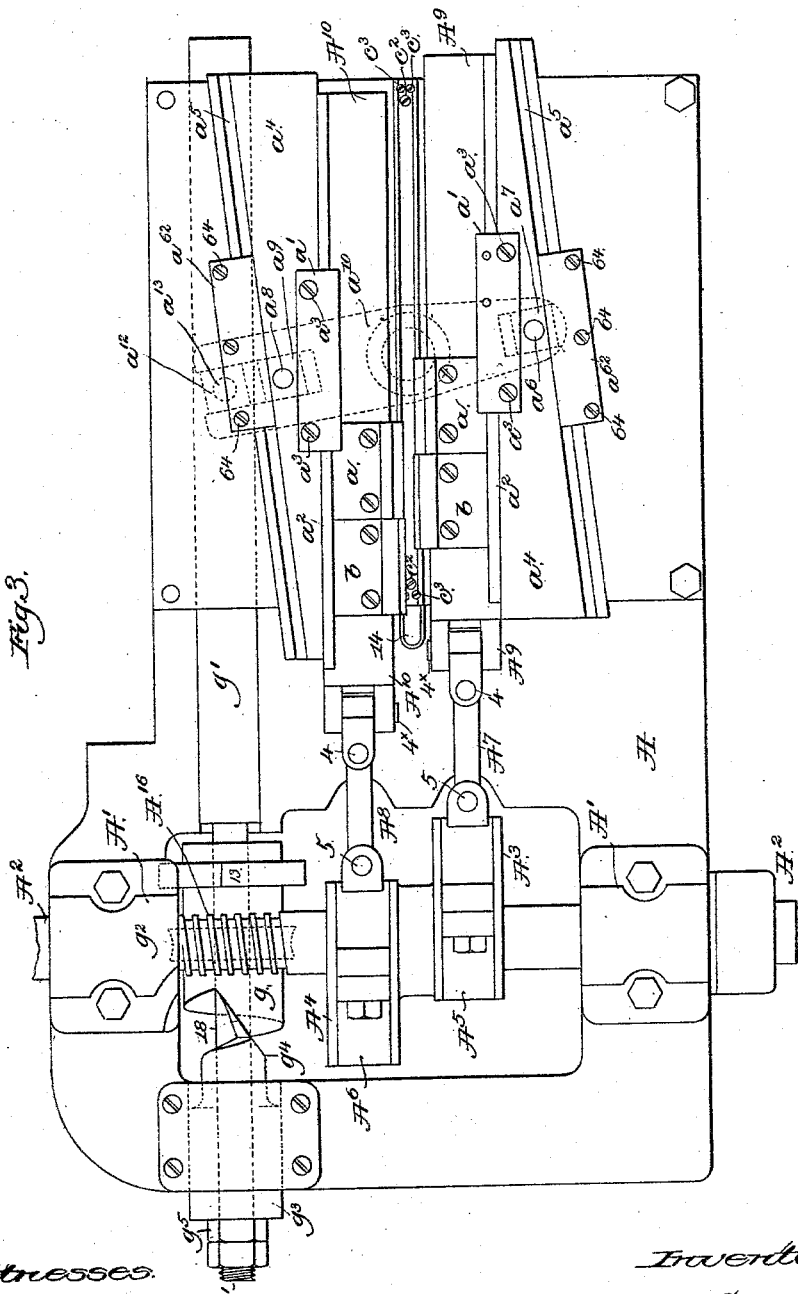
Witnesses.
John F. C. Prindle
Frederick L. Emery
Inventor.
Henry H. Cummings
by Crosby & Gregory
Attys.

(No Model.)   6 Sheets—Sheet 4.
H. H. CUMMINGS.
MACHINE FOR MAKING RIVETS.
No. 414,683.   Patented Nov. 12, 1889.
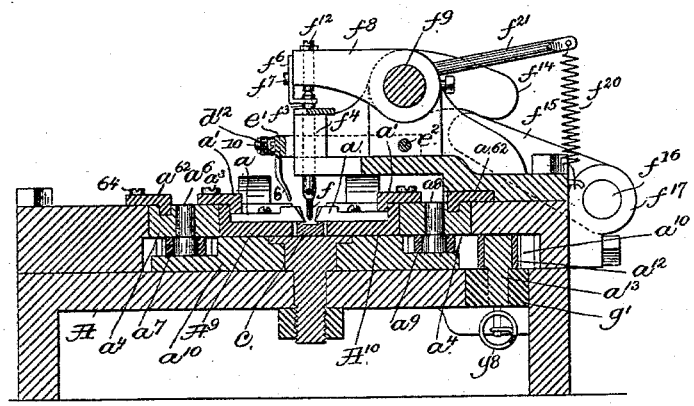
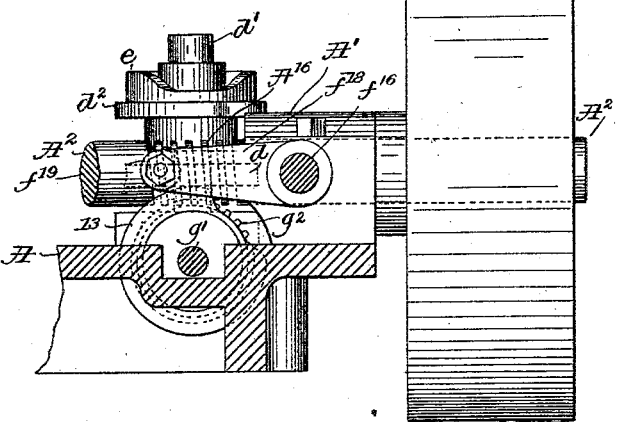
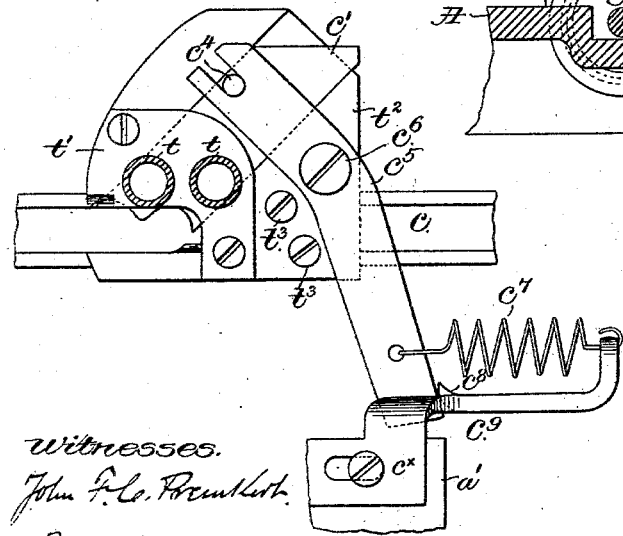

(No Model.)  6 Sheets—Sheet 5.
H. H. CUMMINGS.
MACHINE FOR MAKING RIVETS.
No. 414,683. Patented Nov. 12, 1889.
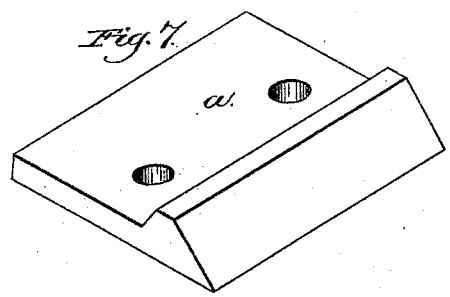
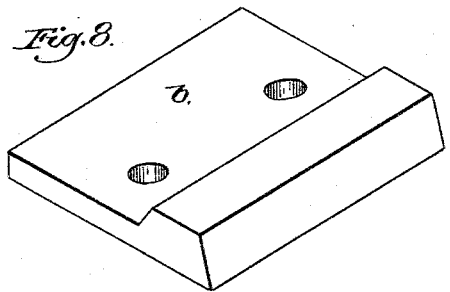
 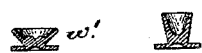
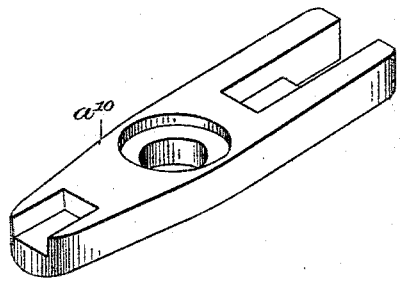
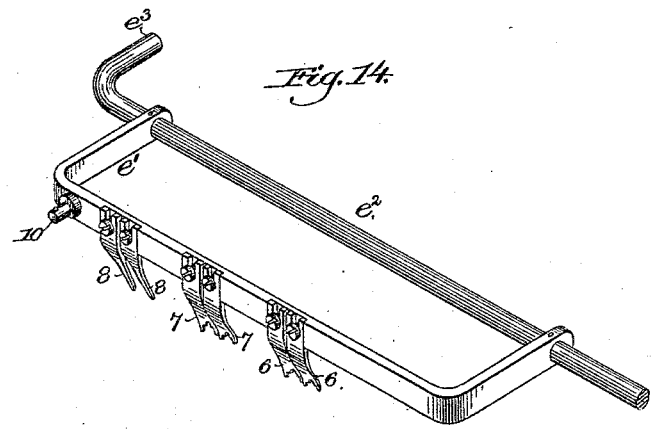
Witnesses.  Inventor:
Henry H. Cummings.
by Crosby & Gregory
Attys.

(No Model.) 6 Sheets—Sheet 6.
H. H. CUMMINGS.
MACHINE FOR MAKING RIVETS.
No. 414,683. Patented Nov. 12, 1889.
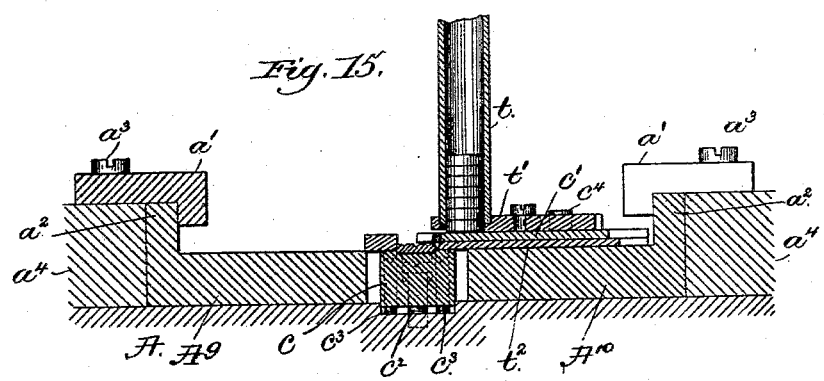
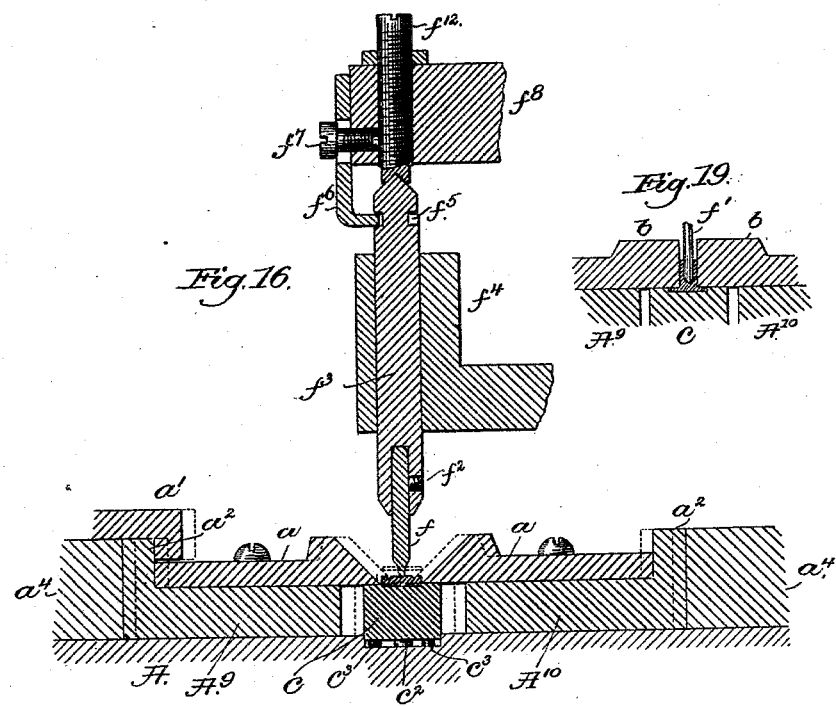
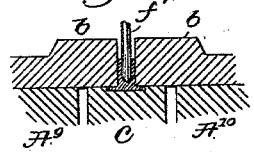
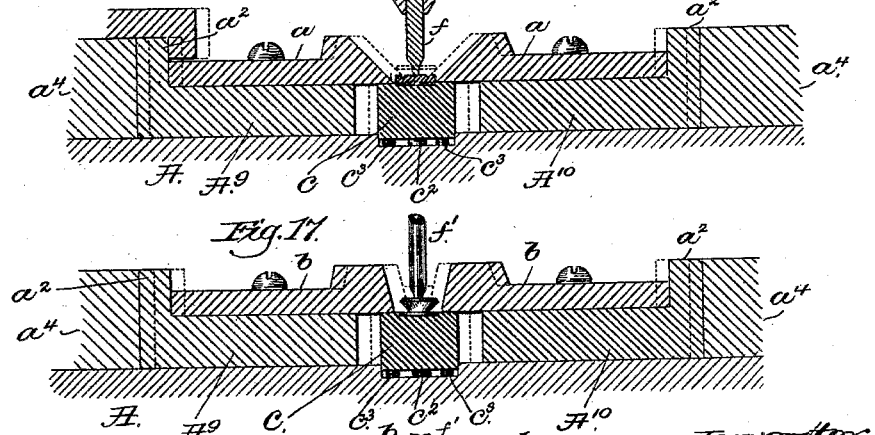

UNITED STATES PATENT OFFICE.

HENRY H. CUMMINGS, OF MALDEN, MASSACHUSETTS.

MACHINE FOR MAKING RIVETS.

SPECIFICATION forming part of Letters Patent No. 414,683, dated November 12, 1889.

Application filed June 8, 1889. Serial No. 313,536. (No model.)

*To all whom it may concern:*

Be it known that I, HENRY H. CUMMINGS, of Malden, county of Middlesex, State of Massachusetts, have invented an Improvement in Machines for Making Rivets, of which the following description, in connection with the accompanying drawings, is a specification, like letters on the drawings representing like parts.

This invention has for its object the production of a machine for the manufacture of rivets having hollow tubular bodies or shanks.

The machine to be herein described is adapted to take a sheet-metal disk-shaped blank, cut into the edge of the same toward its center, and gradually turn over the metal and elongate the same to form a hollow point and body for the rivet and leave a head of greater diameter than the body.

In the manufacture of rivets upon the machine herein to be described the substantially-circular disk-shaped blanks will preferably be formed by punching them from a sheet of metal, the thickness of the sheet being more or less, according to the length desired for the body of the rivet and the diameter desired for its head, and during the operation of making the rivet the blank will be rotated by the action against it first of the grooving dies or surfaces, which cut into the periphery of the blank toward its center, and thereafter by the action of the body-shaping dies or surfaces, which act to form the body of the rivet, the blank being fed from one to the other of the said surfaces, as required, each die doing its own work in proper succession. The blank may, however, be made by cutting a rod of the desired diameter into short lengths. The grooving and shaping surfaces will preferably be reciprocated rapidly and be made to gradually approach the center of rotation of the blank.

This invention in machines for making tubular rivets from a disk-like blank consists in the combination, with a raceway or support for one side of the blank, of die-carriers and grooving-dies to cut into the periphery of the blank to turn a portion of the blank away from the head-forming portion to constitute a tubular body for the rivet, substantially as will be described; also, in the combination, with a raceway or support for one side of the blank and a presser or holder to act on the other side of the blank, of grooving-dies to cut into the periphery of the blank; also, in a machine for making rivets, the following instrumentalities, viz: a raceway or support for one side of the block, die-carriers, and grooving-dies to cut into or enter the periphery of the blank, of body-shaping dies or surfaces; also, in a machine for making rivets, the following instrumentalities, viz: die-carriers, blank-grooving dies or surfaces, body-shaping dies or surfaces, and means to cause the said dies to gradually approach the center of rotation of the said blanks; also, in a machine for making rivets, the following instrumentalities, viz: die-carriers, blank-grooving dies or surfaces to cut into the periphery of and rotate the blank, body-shaping dies or surfaces, devices to support and hold the said blanks so that they may be freely rotated, and feeding mechanism to feed the grooved blanks from between the grooving dies or surfaces into position between the body-shaping dies or surfaces; also, in a machine for making rivets, the following instrumentalities, viz: reciprocating die-carriers, grooving-dies attached thereto to cut into the opposite edges of and rotate a blank, reciprocating body-shaping surfaces, and movable guides or tracks for the said die-carriers, whereby the said dies or surfaces are made to gradually approach each other and enter more or less into the blank from its periphery to shape the head and elongate the blank to form the body of the rivet; also, in a machine for making rivets, the following instrumentalities, viz: a chute or tube to hold blanks, a raceway or support for the blank, a pick-off to remove the blanks from the said chute or tube to the said raceway or support, mechanism to retain the blank in position to be rotated, reciprocating die-carriers, grooving dies or surfaces to cut into the periphery of the blank, dies to thereafter act upon and shape the body of the blank, and feeding mechanism to take the said blanks from one to the other of the said dies.

Figure 2:
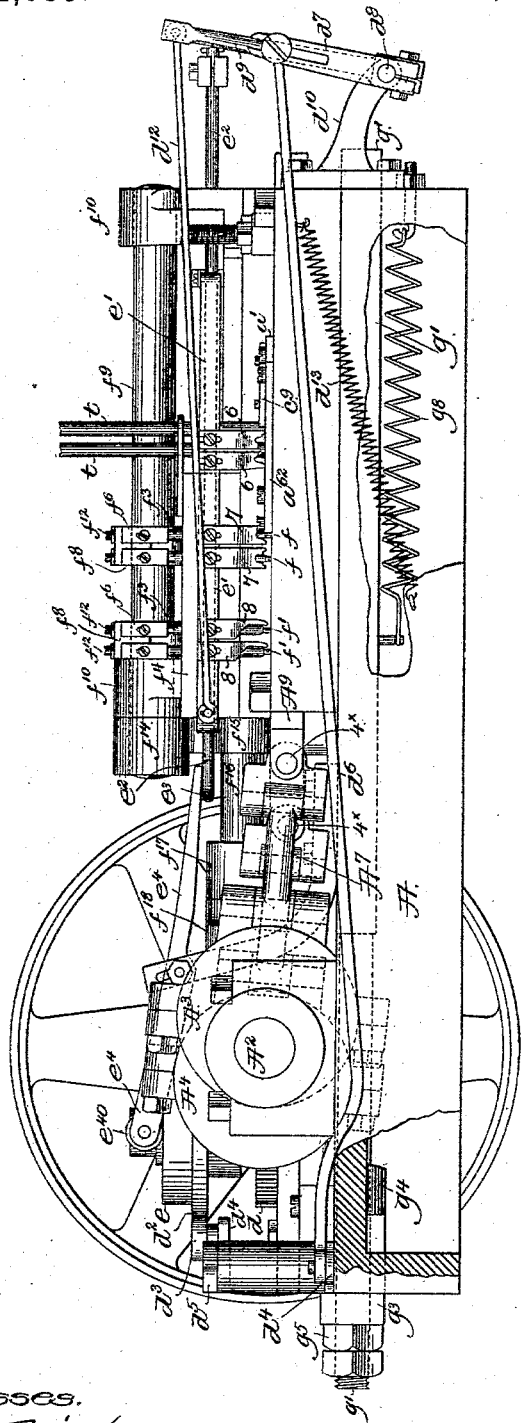
Figure 4:
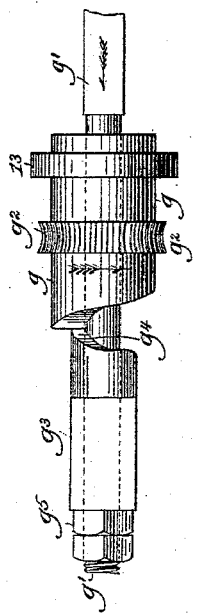

Figure 1 represents a top or plan view of one form of machine embodying this invention; Fig. 2, a left-hand side elevation, partially broken out, of the machine shown in Fig. 1. Fig. 3 is a plan view or detail showing the die-carrying slides, the wedges, the blocks or frame for guiding them, and the dies, the slide-rod, the cam-block, and the cam-hub; Fig. 4, a detail showing the cam-block and cam-hub with part of the slide-bar; Fig. 5, a partial section in the line $x$, Fig. 1; Fig. 6, a partial section in the line $x'$. Fig. 7, in perspective, shows one of the cutting-dies detached. Fig. 8 shows one of the body-forming dies detached. Fig. 9 shows in perspective the blank to be operated upon. Fig. 10 shows in section the blank in the condition in which it is left by the first set of dies. Fig. 11, in section, shows a rivet made from the said blank by the action thereon of the body-shaping dies. Fig. 12 shows the lever for moving the wedges. Fig. 13 shows the pick-off separately in plan view, but enlarged. Fig. 14, in perspective, shows the feed-frame separately with its attached feeding-fingers. Fig. 15 is a sectional detail in the line of the chute, but enlarged; Fig. 16, a partial section to show the cutting-dies with the blank between them and about to be acted upon, the dotted line showing the dies fully moved in to cut into the blank; Fig. 17, a sectional detail to show the blank on the raceway in position to be acted upon by the body-shaping dies or surfaces. Fig. 18 is a detail showing a modified form of body-shaping dies. Fig. 19 is a modification showing body-shaping dies of proper cross-section to leave the bodies of the rivets tubular, and Fig. 20 shows a rivet such as may be made or shaped by the dies represented in Fig. 19.

The machine herein to be described is adapted to take a metallic disk-like blank $w$, (see Fig. 9,) cut a groove in its periphery, and overturn a part of the metal, as at $w'$, Fig. 10, and then by a further operation, performed by body-shaping dies, shape the overturned part of the blank to form a shank or body for the rivet, as shown in Fig. 11, the body being hollow or tubular, so that its end may be upset as an eyelet. These blanks may have a centering depression 2 and a defined overturning groove 3; but the said depression and groove are not necessary.

The bed A of the machine has bearings $A'$ for the main rotating shaft $A^2$, provided with two cams or eccentrics $A^3$ $A^4$, surrounded, respectively, by eccentric-straps $A^5$ $A^6$, having like connecting-rods $A^7$ $A^8$, which are jointed, respectively, to the two die-carriers $A^9$ $A^{10}$. The pins 4, $4^\times$, and 5 in the said connecting-rods enable the die-carriers to be moved laterally on the bed of the machine, as will be described, as they are being reciprocated in opposite directions by the eccentrics. The die-carriers $A^9$ $A^{10}$ have attached to them, respectively, like cutting or grooving dies $a$ (shown in Figs. 1, 3, and 16, and separately in Fig. 7) and body-shaping dies $b$. (Shown in Figs. 1, 3, and 17, and separately in Fig. 8.)

The blanks $w$, to be made into rivets each having a head and tubular body, are placed in chutes or tubes $t$, preferably in piles, as shown in Fig. 15. One or more chutes or tubes may be employed, according to the number of blanks upon which it is desired that the dies referred to shall operate simultaneously and in succession.

The machine herein shown is represented as adapted to operate on two blanks at each operation; but by adding parts like those to be described, and changing the length of stroke of other parts, more than two blanks may be operated upon at the same time.

The two chutes or tubes $t$ are erected upon a plate $t'$, secured to a plate $t^2$, fastened to the raceway $c$ by screws $t^3$, the said plate $t^2$ being extended over the die-carrier $A^{10}$. (See Fig. 1.) In the space between the plates $t'$ and $t^2$, I have placed a pick-off $c'$, (it being best shown in Figs. 1 and 15 and separately in Fig. 13,) the said pick-off having concavities at its front end to embrace the lowermost blanks of the columns of blanks and push them laterally out upon the raceway $c$, it preferably having suitable parallel guide-walls. The distance between the said guide-walls (best shown in Figs. 15 to 17) will preferably be just sufficient to receive the blanks between them, and the said race acts as a guide for the lower or head-forming end of the blank, which end is not materially if at all, changed in diameter during the operation of forming the rivet. The raceway $c$ is fixed to the bed of the machine by a suitable screw or screws, as $c^2$, one of which is shown in Fig. 15, and with the race-way I preferably employ adjusting-screws $c^3$ by which to level and adjust the raceway. The pick-off $c'$, when retracted, passes to the rear of the column of blanks, and then the lowermost blank or blanks drop down in front of it. The pick-off $c'$ has a stud $c^4$, which is engaged by the slotted end of a lever $c^5$, pivoted at $c^6$. The lever $c^5$ is connected at one end (see Fig. 13) with a spring $c^7$, which normally acts to move the lever in the direction to cause the said pick-off to deliver blanks upon the raceway or support $c$, on which the blanks rest and travel while being made into rivets. The end of the lever $c^5$ is acted upon by a lip $c^8$ of a plate $c^9$, attached by a screw $c^\times$, as herein shown, to a gib-plate $a'$, to be described, the plate $c^9$ being extended (see Fig. 13) and having connected to it, as shown in said figure, one end of the spring $c^7$ referred to, which spring is attached at its other end to the lever $c^5$. The lever $c^5$ is retracted by the action of the lip $c^8$ against it as the plate $c^9$ is moved toward the left in Fig. 1. The shaft $A^2$ has a worm $A^{16}$, which engages a worm-gear $d$, (shown by full lines in Fig. 1 and by dotted lines, Fig. 6,) mounted loosely on a stud $d'$. The gear $d$ is connected to or forms part of a double cam $d^2$ and $e$.

The purpose of the cam $e$ is to move the blank-feeding mechanism, it consisting, as herein shown, of a feeding-frame $e'$, having preferably four motions, viz: a sliding and a rocking and an up and down movement.

This frame $e'$ has a series of feeding-fingers 6 7 8, (shown as arranged in sets of two.) The feeding-frame has as part of it a rod $e^2$, which is free to slide longitudinally and rock in suitable rigid guides, and this rod has an arm or projection $e^3$, which, when the said frame is to be rocked to lift the feeding-fingers from engagement with the blanks $w$ preparatory to the backward movement of the feeding-frame, as will be described, is acted upon by a lever $e^4$, having a roller $e^{40}$, (see Fig. 1,) which is acted upon by the cam $e$. The descent of the feeding-fingers upon the blank is due chiefly to gravity, the shape of the cam $e$ being, however, such (see Fig. 6) as to permit such descent at a definite time. The frame $e'$ derives its sliding or horizontal backward movement to place it in position to enable the feeding-fingers to descend upon the blanks by the cam $d^2$, it acting on a roller or other stud $d^3$ of a lever $d^4$, pivoted at $d^5$, the link $d^6$, rock-shaft $d^7$ $d^8$ $d^9$ in bearings $d^{10}$, and link $d^{12}$ engaging a stud 10 of the said feeding-frame. The forward or feeding movement of the feeding-frame is effected by the spring $d^{13}$, connected to the rod $d^6$ and to a part of the bed of the machine.

Instead of the devices shown for actuating the feeding-frame, or instead of the particular fingers shown, any usual or well-known mechanism may be employed which is capable of acting intermittingly to engage and move the blanks in succession into position to be acted upon by the dies employed to shape the blanks and form tubular rivets.

The blanks, while being operated upon at their peripheries by the cutting and body-shaping dies $a$ and $b$, to be described, are kept down upon the raceway or support $c$ by presser-feet or holders $f$ and $f'$. (Also shown as arranged in sets of two.) These presser-feet or holders are all alike, and each, as shown, consists of a rod the low end of which is pointed to enter the centering depression of the blank, if the blank is provided with such a depression. Each rod, one being shown enlarged in Fig. 16, is connected by a screw $f^2$ to the lower end of a bar $f^3$, which, as herein represented, is mounted loosely and so as to slide vertically in a yoke $f^4$. The upper end of each bar $f^3$ is provided with an annular groove $f^5$, which is entered by a forked piece $f^6$, adjustably connected by a screw $f^7$ with a lever or arm $f^8$ of a rock-shaft $f^9$, having its bearings at $f^{10}$ in the said yoke. The like arms $f^8$, for actuating the presser-feet or holders, are provided with adjustable stops $f^{12}$, represented as screws having their lower ends shaped to engage the upper ends of the bars. By adjusting the forked piece $f^7$ and the stop $f^{12}$ the rod $f^3$ and presser-foot or holder attached to it may be made to descend more or less at each movement of the rock-shaft $f^9$. The presser-feet or holders descend upon the blanks after they are brought in position under them by the feeding mechanism, and are made to rise and release the blanks when the feeding mechanism acts to move the blanks along the raceway. To turn the said rock-shaft $f^9$ at the proper times to cause the feet $f f'$ to descend upon the blanks below them, the said rock-shaft has been provided with an arm $f^{14}$, (see Figs. 1 and 5,) which is acted upon by an arm $f^{15}$ of a rock-shaft $f^{16}$, held in bearings $f^{17}$, the said rock-shaft having a second arm $f^{18}$, provided with a roller or other stud $f^{19}$, which is acted upon by a cam 13 on or forming part of a cam-hub $g$, loose on a slide-rod $g'$, the said cam having worm-teeth $g^2$, (see Figs. 4 and 6,) which are engaged by the worm $A^{16}$, before described. A spiral spring $f^{20}$, (see Fig. 5,) connected to a rod $f^{21}$, extended backwardly from one of the arms $f^8$, normally act to raise the presser-feet and keep the roller-stud $f^{19}$ against the cam 13.

In practice the feeding-fingers 6 descend upon the blanks as they are delivered upon the raceway $c$ by the pick-off or equivalent device, and then the feed-frame $e'$ is moved longitudinally to carry the said blanks into position between the cutting-dies $a$ and under the presser-feet or holders $f$, when the latter descend upon and hold the blanks, while the feeding fingers or devices rise from the blanks and return into position to engage new blanks.

It will be understood that the feeding-fingers 7 and 8 act in unison with the feeding-fingers 6 6, only the fingers 7 act to take blanks already cut and partially formed into rivets from between the cutting-dies $a$ $a$ into position between the shaping-dies $b$ and under the presser-feet or holders $f'$, while the feeding-fingers 8 act to take the completed rivets from between the body forming or shaping dies $b$ and discharge them from the raceway—as, for instance, through a throat or slot 14 (shown in Fig. 1) in the bed-plate.

The die-carriers $A^9$ and $A^{10}$, to which the cutting-dies $a$ and body-shaping dies $b$ are connected at a short distance apart, and which dies are herein represented as adapted to be reciprocated rapidly in opposite directions by the eccentrics described, must be so held during their movements that the edges of the cutting-dies $a$ and also the edges of the body forming or shaping dies $b$ may be made to gradually approach each its mate and the center of the blank, the said blanks, by the contact of their peripheries with the moving dies, rapidly rotated, as herein shown, in one and then in the other direction, because the said dies reciprocate. The edges of the dies of each pair act upon the said blanks at diametrically-opposite points.

To properly guide the die-carriers and move them to cause the dies to enter the blank, each die-carrier has at one edge a lip $a^2$, which is embraced by a downturned lip of a guide-block $a'$, attached by screws $a^3$ or in other suitable manner to a controlling-block $a^4$, the said controlling-blocks (best shown in Figs. 1 and 3) being lettered alike and shown as of wedge shape, the inclined faces thereof being parallel; but the blocks are moved simultaneously in opposite directions. These controlling or wedge blocks have near one edge a groove, as $a^5$, into which enter downturned lips of guide-plates $a^{62}$, attached by screws 64 or in other suitable manner to a rigid part of the bed of the machine. These controlling or wedge blocks are made to travel in one direction slowly, as when the dies are acting upon the blanks to shape the same, so that the dies $a$ and $b$ may gradually work farther and farther into the blanks; but when the dies are to be moved apart or separated to enable the blanks to be fed, as described, on the raceway, then the said blocks or wedges should be moved quickly away from the blanks. To do this, one wedge has a stud $a^6$, on which, below the wedge, is a loose block $a^7$, (see Fig. 5,) and the other wedge has a like pin $a^8$ and block $a^9$. These two blocks enter slots in a centrally-pivoted lever $a^{10}$. (See Fig. 12.) The slot at the right-hand end of the lever $a^{10}$ (see Figs. 5 and 12) is long enough to receive a second block $a^{12}$ on a stud $a^{13}$, fast on the slide-rod $g'$, suitably guided in the frame-work or bed, the said slide-rod $g'$ being extended loosely through the cam-hub $g$, before described, the said cam-hub being free to rotate; but it cannot slide or move longitudinally. The rod $g'$ has adjustably connected to it a cam-block $g^3$, having a cam-shaped toe $g^4$. The cam-block $g^3$ is made adjustable on the slide-rod $g'$ by the nut $g^5$, adjustment of the cam-block on the rod varying the extent of throw of the lever $a^{10}$ and the depth to which the dies $a$ cut into the blanks $w$. The square edges of the cam-block $g^3$ are guided in a bearing in the frame-work. The end of the cam-hub $g$ next the cam-block $g^3$ has a cam-face, a part of which is of a gradual spiral, as shown in full lines, Figs. 3 and 4, and dotted in Fig. 1, the said spiral terminating with a heel 18. (See Fig. 3.)

While the spiral part of the cam $g$, in its rotation in the direction of the arrow thereon, (see Fig. 4,) acts on the toe $g^4$ of the cam-block $g^3$, the slide-rod $g'$ is gradually moved in the direction of the arrow thereon, (see Fig. 4,) and the wedge-blocks are gradually slid in the direction to move the die-carriers $A^9$ $A^{10}$ toward the raceway, thus enabling the edges of the dies $a$ $b$ to gradually enter the blanks or move from their full into their dotted line positions, Figs. 16 and 17; but as soon as the toe $g^4$ passes the heel 18 of the cam-block $g$ then a spring $g^8$ (see Fig. 2) acts to quickly move the said slide-rod $g'$ in a direction opposite the arrow thereon in Fig. 4, thus quickly withdrawing the wedges and removing the dies from the blanks, so that they may be engaged and fed by the feed mechanism, before described, along the raceway, the presser-feet being at such time lifted, as described.

Instead of the controlling blocks or wedges, any other equivalent device to constitute a guide or track on or with relation to which the die-carriers may move as they are made to approach the centers of the blanks may be used; but the wedges are preferred for simplicity and to avoid the use of cams and levers more complex than those herein represented.

Fig. 15 shows a blank as having been pushed by the pick-off from the end of the pile of blanks.

Fig. 16, by full lines, shows the cutting or grooving dies $a$ as brought in contact with the periphery of a blank, the presser-foot or holder having been lowered into the center depression of the blank or upon the center of the blank.

While the dies $a$ are reciprocated rapidly, the wedges will be gradually moved into the position shown by dotted lines, causing the said dies to be pushed toward each other, as indicated by dotted lines, until their cutting-edges cut into the periphery of the blank, the dotted lines showing the said dies in their closed position, they, as they reciprocate rapidly in opposite directions with the blank between them, gradually acting to enter the blank and turn up and over the upper part of the blank into the dotted-line position, Fig. 16, or into the full-line position, Fig. 17. The blank having been shaped by the cutting or grooving dies $a$, as described, the die-carriers are retracted and the feeding mechanism acts to take the partially-shaped blanks from between the dies $a$ and from under the presser-feet or holders $f$ into position between the body-shaping dies $b$, they being then open, as in Fig. 17, and under the presser-feet $f'$, and at the same time the feeding mechanism acts to bring a fresh blank under the presser-foot $f$ and between the cutting or grooving dies $a$. After this the presser-feet descend on the said blanks and the dies are again forced inwardly to act on the blanks. As the body-shaping dies are moved toward the center of the blank (see Fig. 17) from the full into the dotted line positions, the blank shown by full lines, Fig. 17, is made to assume the shape represented by dotted lines, Fig. 17, and full lines, Fig. 12.

The dies $a$ are preferably of like cross-section at every point, and the same is true of dies $b$; but I should consider a rivet-making machine as within the scope of my invention even though the dies tapered in the direction of their length or their actuating edges varied in different cross-sections.

The exterior of the body of the rivet may be more or less tubular or conical, according to the shape of the edges of the dies.

Fig. 18 represents a modified form of body-shaping dies, the edges of the dies being molded.

Although I prefer to use the presser-feet or holders to hold down the blank, yet they may be dispensed with.

I have shown in Figs. 1, 3, 5, 8, and 17 the body-shaping dies as shaped to leave the body of the rivet tapering; but by changing the shape of the acting edges of the dies $b$ the body of the rivet may be shaped externally so as to be substantially cylindrical.

I have shown a body-shaping die in Fig. 19 by which the body of the rivet may be shaped as shown in Fig. 20 or left substantially cylindrical, the exact shape of the body of the finished rivet depending upon the shape of the acting faces of the body-forming dies.

I do not desire to limit my invention to the use of but one pair of body-forming dies, as it is obvious that I might connect to the die-carriers more than one set of body-forming dies and finish the body, if desired, by two operations.

I claim—

1. In a machine for making rivets from a blank, a raceway or support for one side of the blank, combined with die-carriers, and grooving-dies to cut into the periphery of the blank to turn a portion of the blank away from the head-forming portion to constitute a tubular body for the rivet, substantially as described.

2. In a machine for making rivets, the combination, with a raceway or support for one side of the blank, and a presser or holder to act on the other side of the blank, of grooving-dies to cut into the periphery of the blank, substantially as described.

3. In a machine for making rivets, the following instrumentalities, viz: a raceway or support for one side of the blank, die-carriers, grooving-dies, as $a$, to cut into or enter the periphery of the blank, and body-shaping dies or surfaces, as $b$, to operate substantially as described.

4. In a machine for making rivets, the following instrumentalities, viz: movable die-carriers and blank-grooving dies or surfaces, body-shaping dies or surfaces, and means to cause the said dies to gradually approach the center of rotation of the said blanks, substantially as described.

5. In a machine for making rivets, the following instrumentalities, viz: movable die-carriers, blank-grooving dies or surfaces to cut into the peripheries of and to rotate the blanks, body-shaping dies or surfaces, devices to support the said blanks so that they may be freely rotated, and feeding mechanism to feed the blanks from between the grooving dies or surfaces into position between the body-shaping dies or surfaces, substantially as described.

6. In a machine for making rivets, the following instrumentalities, viz: reciprocating die-carriers, grooving-dies carried thereby to cut into the opposite edges of and rotate a blank, body-shaping surfaces attached to the said die-carriers, and movable guides or tracks for the said die-carriers, whereby the said dies or surfaces are made to gradually approach each other and enter more or less into the blank from its periphery to shape the head and elongate the blank to form the body of the rivet, substantially as described.

7. In a machine for making rivets, the following instrumentalities, viz: a chute or tube to hold the blanks, a pick-off to remove the blanks from the said chute or tube, mechanism to support the blank in position to be rotated, die-carriers, grooving dies or surfaces to cut into the periphery of the blank, dies to thereafter act upon and shape the body of the blank, and feeding mechanism to take the said blanks from one to the other of the said dies, substantially as described.

In testimony whereof I have signed my name to this specification in the presence of two subscribing witnesses.

HENRY H. CUMMINGS.

Witnesses:
   GEO. W. GREGORY,
   B. DEWAR.